US008472708B2

(12) United States Patent
Itoh

(10) Patent No.: US 8,472,708 B2
(45) Date of Patent: Jun. 25, 2013

(54) IMAGE PROCESSOR, METHOD FOR PROCESSING IMAGE AND COMPUTER READABLE MEDIUM

(75) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1117 days.

(21) Appl. No.: 11/905,717

(22) Filed: Oct. 3, 2007

(65) Prior Publication Data

US 2008/0205752 A1 Aug. 28, 2008

(30) Foreign Application Priority Data

Feb. 28, 2007 (JP) .................................. 2007-049892

(51) Int. Cl.
*G06K 9/00* (2006.01)
(52) U.S. Cl.
USPC .......................................................... 382/162
(58) Field of Classification Search
None
See application file for complete search history.

(56) References Cited

U.S. PATENT DOCUMENTS

| 5,778,092 | A | * | 7/1998 | MacLeod et al. | 382/176 |
|---|---|---|---|---|---|
| 5,966,455 | A | * | 10/1999 | Saito | 382/112 |
| 5,973,792 | A | * | 10/1999 | Matsuda | 358/448 |
| 6,101,283 | A | * | 8/2000 | Knox | 382/254 |
| 7,085,379 | B1 | * | 8/2006 | Kagechi et al. | 382/166 |
| 7,130,469 | B2 | * | 10/2006 | Adachi | 382/224 |
| 7,190,805 | B2 | * | 3/2007 | Silverstein | 382/100 |
| 7,292,375 | B2 | * | 11/2007 | Nishida | 358/3.26 |
| 7,471,414 | B2 | * | 12/2008 | Xueping | 358/1.9 |
| 7,557,963 | B2 | * | 7/2009 | Bhattacharjya | 358/3.27 |
| 7,783,117 | B2 | * | 8/2010 | Liu et al. | 382/232 |
| 7,805,021 | B2 | * | 9/2010 | Yeoh et al. | 382/294 |
| 7,924,469 | B2 | * | 4/2011 | Ono et al. | 358/3.27 |
| 2002/0071131 | A1 | * | 6/2002 | Nishida | 358/1.9 |
| 2002/0131643 | A1 | * | 9/2002 | Fels et al. | 382/224 |
| 2003/0179411 | A1 | * | 9/2003 | Xueping | 358/3.22 |
| 2005/0041267 | A1 | * | 2/2005 | Hirayama | 358/2.1 |
| 2005/0179946 | A1 | * | 8/2005 | Takamatsu et al. | 358/1.18 |
| 2007/0258660 | A1 | * | 11/2007 | Suino | 382/277 |
| 2008/0123150 | A1 | * | 5/2008 | Ono et al. | 358/3.27 |
| 2008/0123151 | A1 | * | 5/2008 | Goto et al. | 358/3.27 |

FOREIGN PATENT DOCUMENTS

| JP | A-2001-028055 | 1/2001 |
|---|---|---|
| JP | A 2001-169080 | 6/2001 |
| JP | A-2002-369002 | 12/2002 |
| JP | A 2003-51946 | 2/2003 |
| JP | A-2003-274182 | 9/2003 |
| JP | A-2003-283831 | 10/2003 |
| JP | A-2004-336282 | 11/2004 |

OTHER PUBLICATIONS

Office Action issued Feb. 23, 2011 in Japanese Patent Application No. 2007-049892 (with English translation).

* cited by examiner

*Primary Examiner* — Samir Ahmed

(74) *Attorney, Agent, or Firm* — Oliff & Berridge PLC.

(57) ABSTRACT

An image processor, includes: a gradation direction determination unit that determines a gradation direction existing in an image in which a color or density changes; a reference area setting unit that sets a shape of a reference area based on a determination result by the gradation direction determination unit; and a color estimation unit that estimates a color in which a non-target image superimposition does not occur based on a pixel value within the reference area set by the reference area setting unit and substitute an input pixel value with the estimated color.

16 Claims, 8 Drawing Sheets

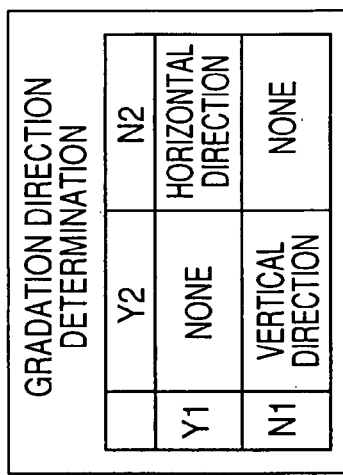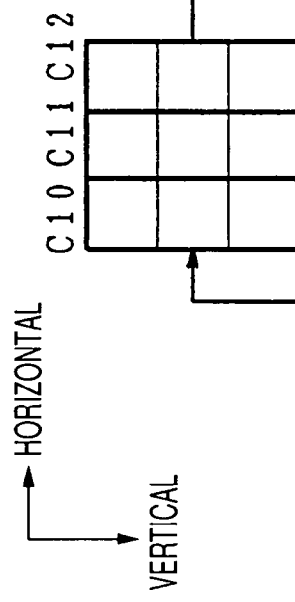

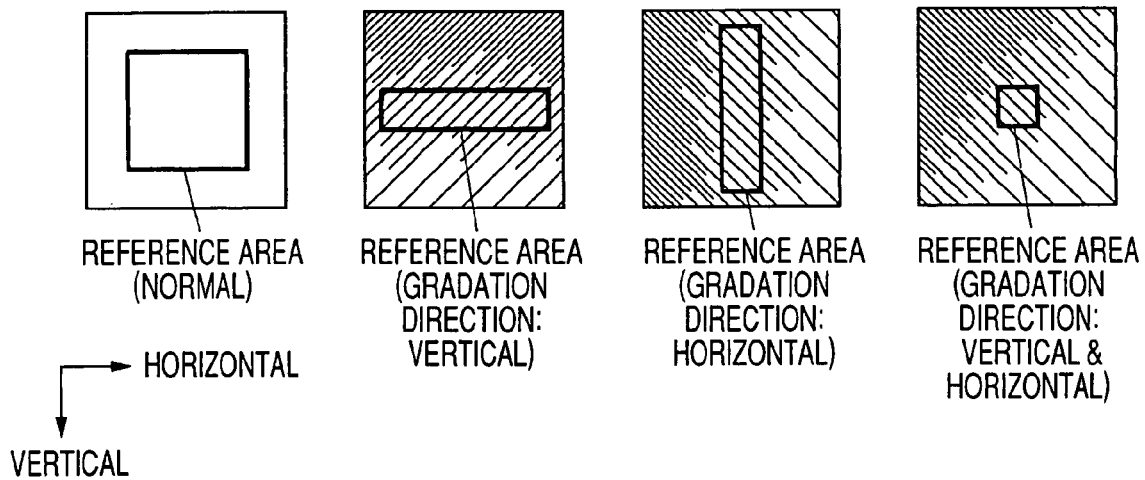
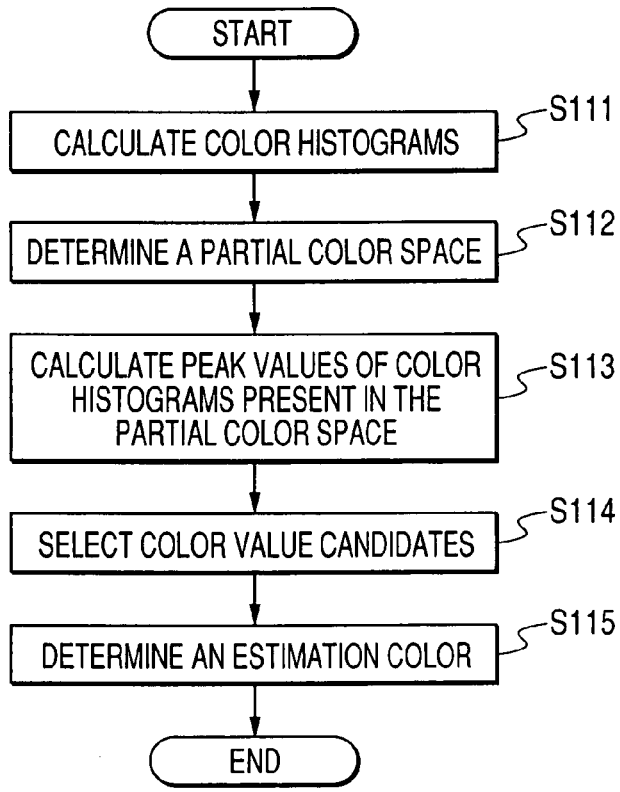

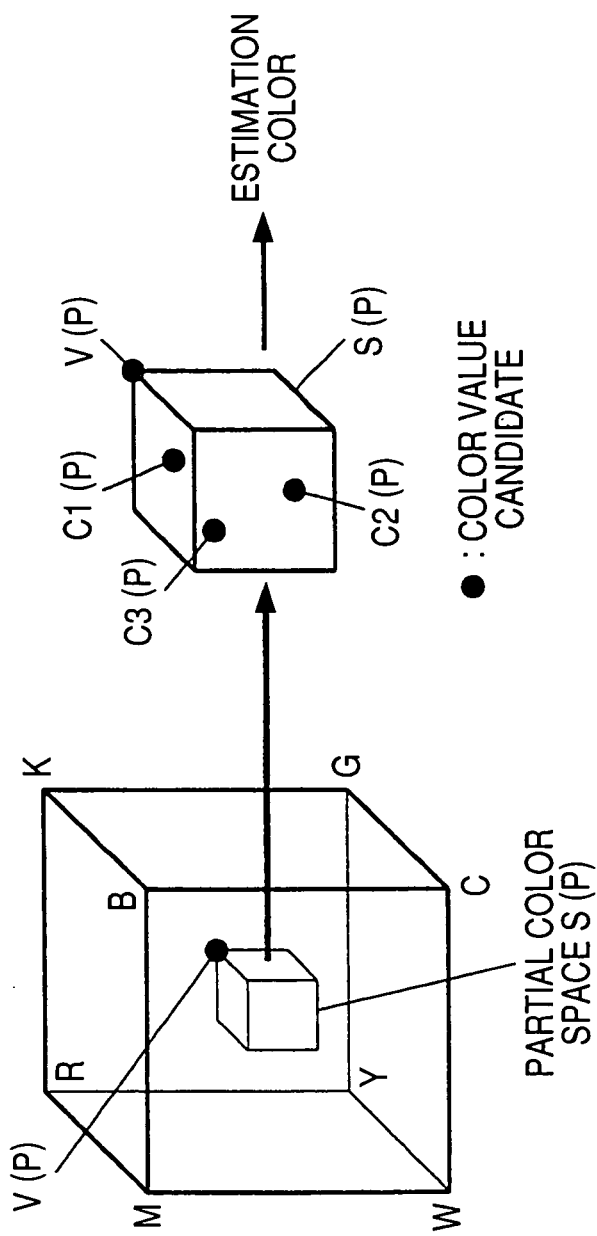

FIG. 8
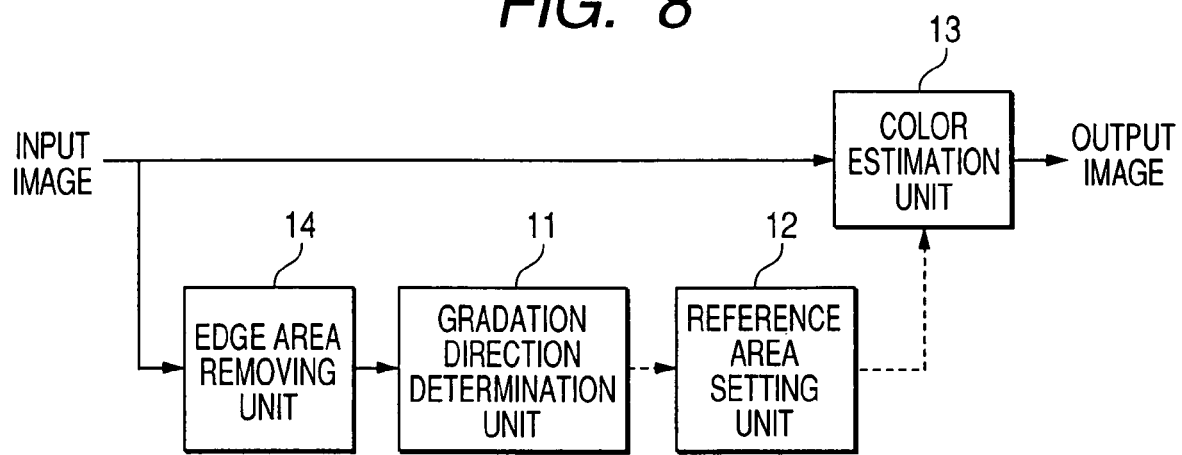
FIG. 9A   FIG. 9B
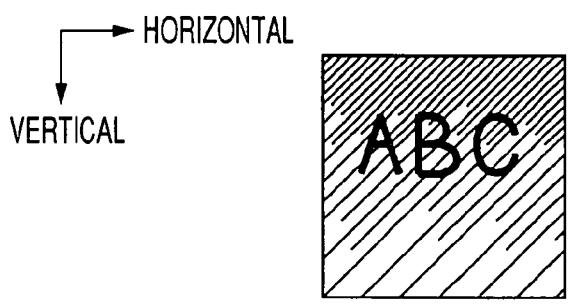
FIG. 9C   FIG. 9D
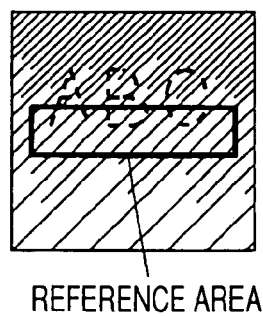   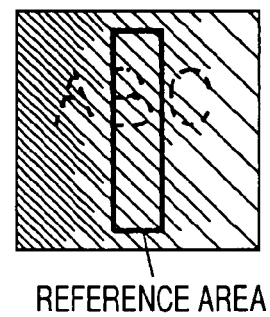
REFERENCE AREA   REFERENCE AREA

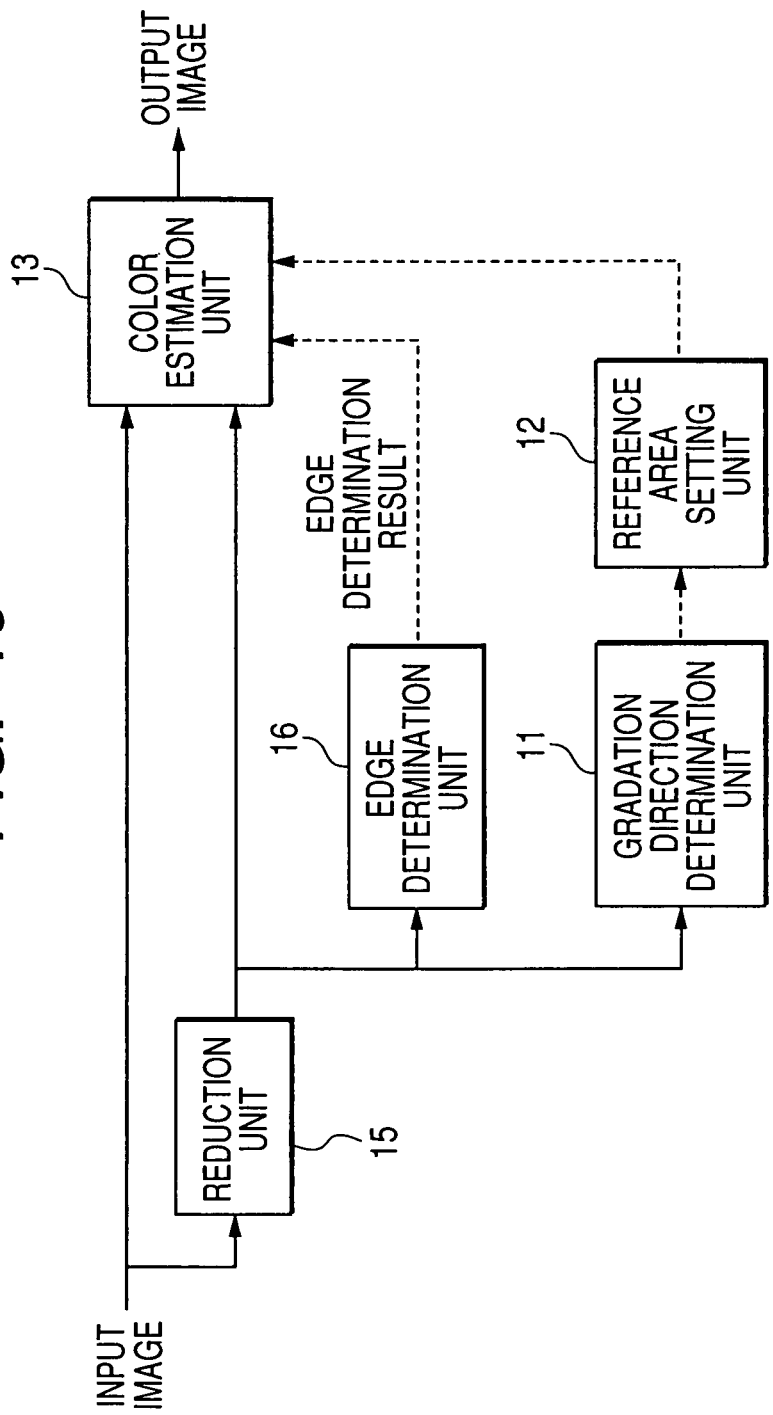

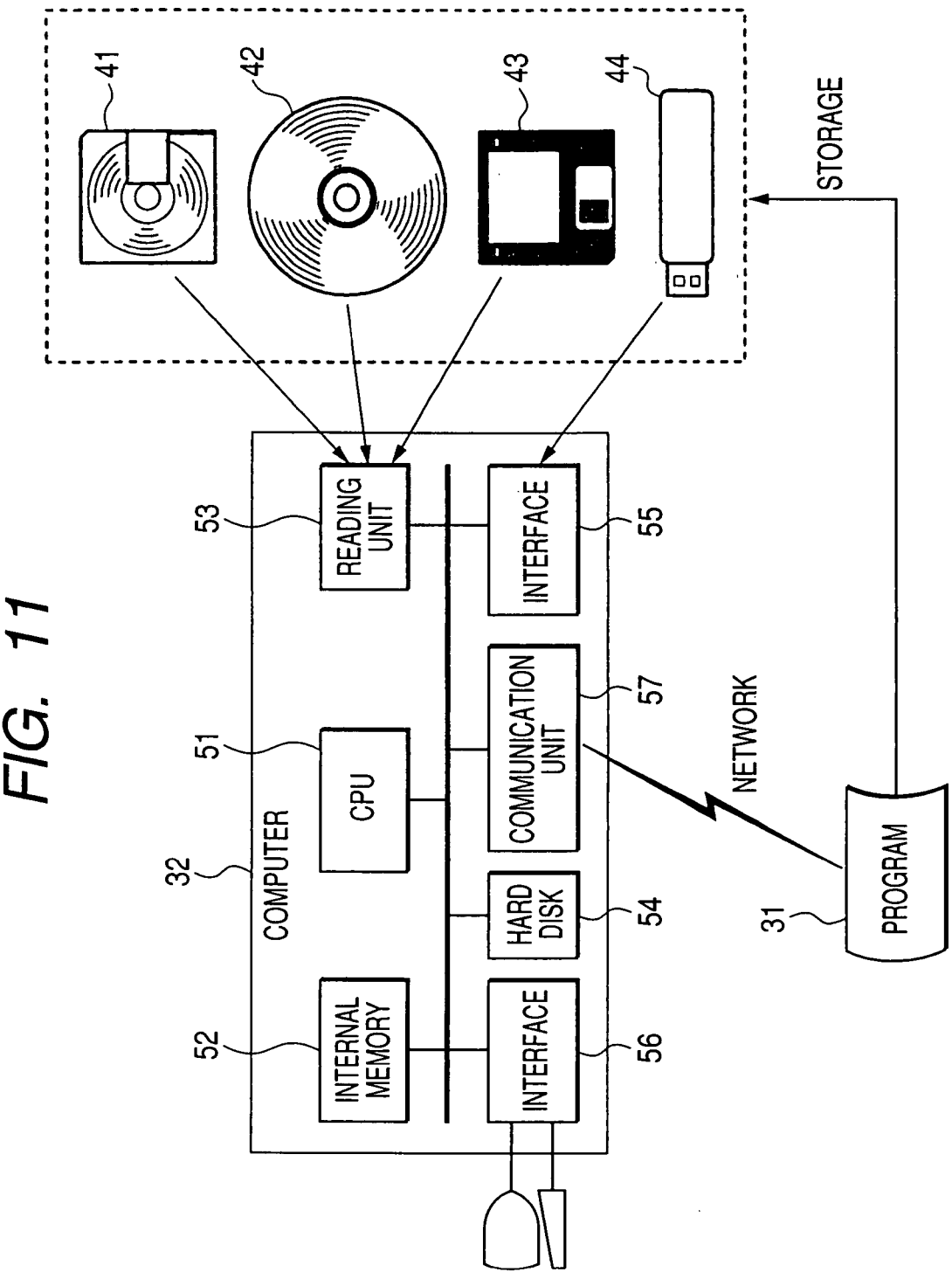

IMAGE PROCESSOR, METHOD FOR PROCESSING IMAGE AND COMPUTER READABLE MEDIUM

CROSS-REFERENCE TO RELATED APPLICATION

This application is based on and claims priority under 35 USC 119 from Japanese Patent Application Nos. 2007-049892 filed Feb. 28, 2007.

BACKGROUND

1. Technical Field

The present invention relates to an image processor, a method for processing an image and a computer readable medium.

2. Related Art

Conventionally, when reading an image on one side of an original sheet which has images on both sides thereof or an image of an original sheet on which one or more other original sheets are stacked, there has been occurring a so-called backside or non-target image reading in which the image on the back side of the original sheet or the image on the one other original sheet stacked on the original sheet is read together with the image on the target side of the original sheet through the same original sheet. In addition, when taking a photo of a subject through a sheet of glass with a digital camera, in some cases, there occurs a so-called non-target image pickup where a scene which has nothing to do with the subject is reflected on the surface of the glass and is eventually picked up together with the target subject. As a result, in either of the cases, images are obtained in which the blurred image which is undesirably read or picked up is superimposed on the desired target image. In the following description, the state in which the blurred undesirably read or picked up image is superimposed on the desired target image will be described as a non-target image superimposition.

As one of techniques which eliminate the non-target image superimposition, a technique is known in which images on both sides of an original sheet are read together, so that the image read from the back side of the original sheet is eliminated by referring to the images on both the sides of the original sheet. In addition, as a method for eliminating the non-target image superimposition from an original sheet which has an image only on one side thereof, there has conventionally been adopted a method in which a so-called background removing process is implemented. The background removing process is such that a gradation correction is performed on the read image according to a certain fixed value or detected background level.

SUMMARY

According to an aspect of the invention, there is provided an image processor, including: a gradation direction determination unit that determines a gradation direction existing in an image in which a color or density changes; a reference area setting unit that sets a shape of a reference area based on a determination result by the gradation direction determination unit; and a color estimation unit that estimates a color in which a non-target image superimposition does not occur based on a pixel value within the reference area set by the reference area setting unit and substitute an input pixel value with the estimated color.

BRIEF DESCRIPTION OF THE DRAWINGS

Exemplary embodiments of the present invention will be described in detail based on the following figures, wherein:

FIG. 4 illustrates an explanatory diagram illustrating the operation of a gradation direction determination unit 11;

FIGS. 5A to 5D illustrate explanatory diagrams showing exemplary examples of the operation of a reference area setting unit 12;

FIG. 6 illustrates a flowchart showing an exemplary example of the operation of a color estimation unit;

FIGS. 7A to 7C illustrate explanatory diagrams illustrating an exemplary example of the color estimation unit;

FIG. 8 illustrates a block diagram showing a second exemplary embodiment of the invention;

FIGS. 9A to 9D illustrate explanatory diagrams showing specific examples of a relationship between gradation and reference area in the second exemplary embodiment of the invention;

FIG. 10 illustrates a block diagram showing a third exemplary embodiment of the invention; and FIG. 11 illustrate an explanatory diagram showing exemplary examples of a computer program which results when realizing the functions described in the respective exemplary embodiments by a computer program and a storage medium which stores the computer program and a computer installing therein the storage medium.

DETAILED DESCRIPTION

Figure 1:
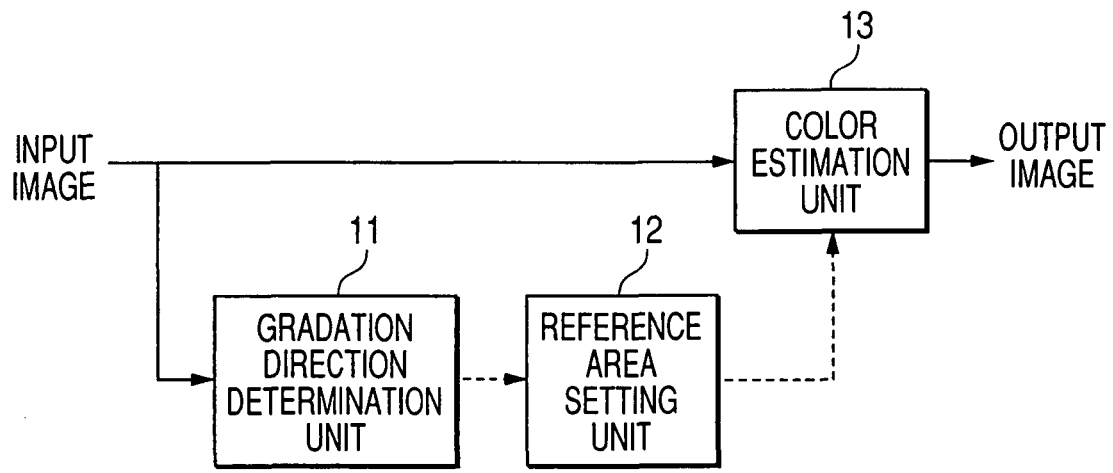
FIG. 1 illustrates a block diagram showing a first exemplary embodiment of the invention.

FIG. 1 is a block diagram which shows a first exemplary embodiment of the invention, in which reference numeral 11 denotes a gradation direction determination unit, 12 a reference area setting unit, and 13 a color estimation unit. Although any image can be inputted, since a process is performed for removing a non-target image superimposition, in particular, an image may be inputted in which a non-target image superimposition is occurring. As has been described above, the non-target image superimposition occurs in many cases, for example, when reading an image on one side of an original sheet which has images formed on both sides thereof or an image on an original sheet on which one or more other original sheets which have images thereon are stacked, and in here, the non-target image superimposition is equally applied to an image in which a non-target image is picked up and superimposed on a target subject.

The gradation direction determination unit 11 determines a gradation direction which is a direction in which a color or density present in an image changes. This determination is implemented portion by portion or area by area in an image.

The reference area setting unit 12 sets a shape of a reference area which is employed when a color is estimated by the color estimation unit 13, which will be described later in this specification, based on a result of a determination carried out by the gradation direction determination unit 11. Setting of a reference area is implemented in such a way that the width of a gradation direction in a reference area becomes short relative to the width of another direction which is oriented in a different direction. When setting a reference area, in addition to the gradation direction, other various factors may be taken into consideration for determination.

Figure 2:
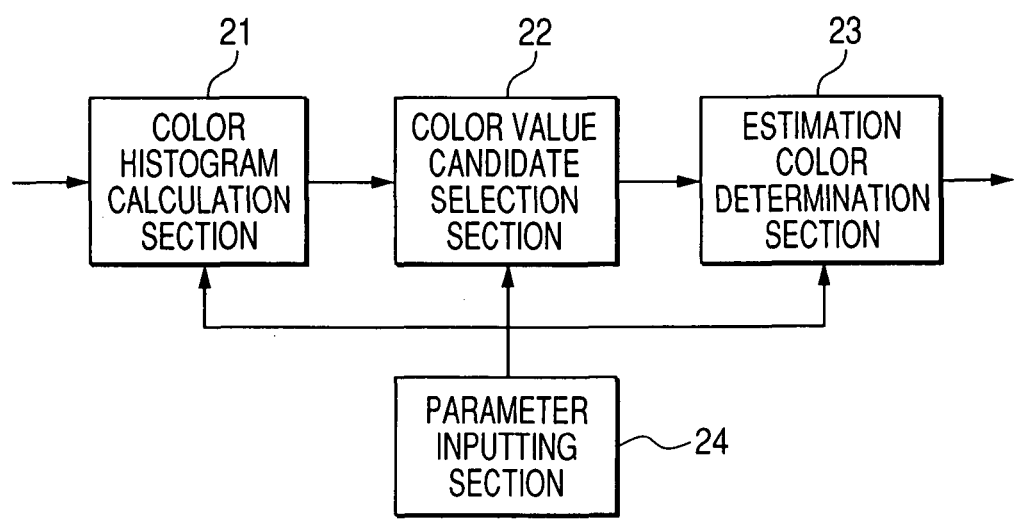
FIG. 2 illustrates a block diagram showing an exemplary example of a color estimation unit 13.

The color estimation unit 13 estimates an original color in which no non-target image superimposition is taking place based on a pixel value within a reference area set by the reference area setting unit 12 and outputs an image in which the pixel value of the image which is inputted is substituted with the estimated color. FIG. 2 is a block diagram showing an example of the color estimation unit 13. In the figure, reference numeral 21 denotes a color histogram calculation section, 22 denotes a color value candidate selection section, 23 denotes an estimation color determination section, and 24 denotes a parameter inputting section. The color histogram calculation section 21 calculates a color histogram for each pixel within a reference area set by the reference area setting unit 12 which includes a target pixel to be processed.

The color value candidate selection section 22 substitutes the color of a target pixel to be processed, that is, selects a candidate (a color value candidate) for the original color in which no non-target image superimposition occurs. As a process therefor, for example, a quadratic differential is performed on a histogram within a partial color space which includes a position which corresponds to the color of the target pixel for process in a color space, so as to obtain the color (a color in which the frequency becomes a local maximum or extremum) of a convex portion of the frequency. The color of the convex portion of the frequency so obtained may be made to be a color value candidate.

The estimation color determination section 23 determines an estimation color which is estimated as the original color in which the non-target image superimposition does not occur from the color value candidates selected at the color value candidate selection section 22. There are considered several methods as a determination method. For example, a color value candidate which has a maximum frequency value, a color value candidate which has a small color difference between the color of the target pixel for process and the color thereof, a color value candidate which has a high brightness and the like may be selected from the color value candidates. Of course, these color value candidates may be combined or selections based on other conditions may be made. Alternatively, an intermediate color of a plurality of color value candidates may be determined as the estimation color, or the estimation color may be determined by performing a weighted operation from a relationship with the color of the target pixel for process. Thus, the estimation color can be determined using the other various methods.

Parameters are inputted into the parameter inputting section 24 from an input device such as a keyboard, or the parameter inputting section 24 obtains parameters which are stored in advance, so that the parameters so inputted or obtained are set in the respective sections such as the color histogram calculation section 21, the color value candidate selection section 22 and the estimation color determination section 23. For example, when receiving a set reference area from the reference area setting unit 12, the parameter inputting section 24 sets parameters according to the reference area so set in the respective sections.

Figure 3:
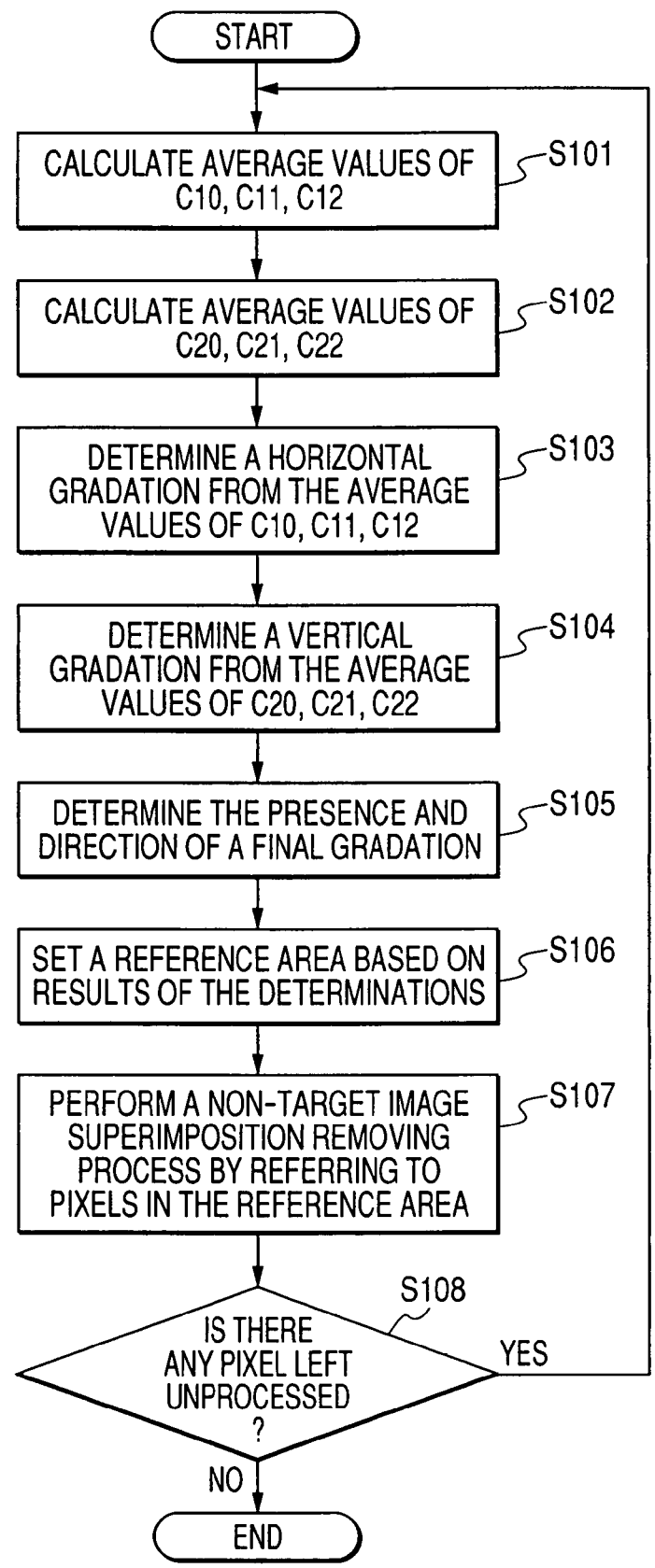
FIG. 3 illustrates a flowchart showing an exemplary example of the operation of the first exemplary embodiment of the invention.

FIG. 3 is a flowchart which shows an example of the operation of the first exemplary embodiment according to an aspect of the invention. Firstly, in steps S101 to S105, the gradation direction determination unit 11 determines a direction of a gradation present in an image. FIG. 4 is a diagram which explains an example of the operation of the gradation direction determination unit 11. Here, as an example, when the color or density of an image changes in a direction which is regarded as vertical in the figure, a gradation direction is determined as vertical. In addition, the figure also shows an example in which when the color of density of the image changes in a direction which is regarded as horizontal in the figure, a gradation direction is determined as horizontal. In addition to these cases, the gradation direction determination may, of course, be determined by detecting a change in color or density in an oblique direction including, for example, a direction inclined through 45 degrees or 135 degrees relative to the horizontal direction.

In FIG. 4, a process from (A) to (B) is such as to detect a horizontal gradation, and a process from (C) to (D) is such as to detect a vertical gradation. Squares in (A) and (B) of FIG. 4 indicate several pixels in an image or an area made up of, for example, n×n pixels, and in the example shown in FIG. 4, the direction of a gradation is determined by referring to 3×3 areas. The size of an area or number of areas which are referred to when determining a gradation direction are, of course, arbitrary.

In S101 in FIG. 3, an average value of pixels which are contained in a vertical narrow area is obtained area by area. In the example shown in (A) of FIG. 4, this is performed on the 3×3 areas which are divided into vertical narrow areas which are defined by thick solid lines and are each made up of three vertically aligned areas, that is, an average value of pixels which are contained in each of the vertical narrow area is obtained area by area, and the obtained average values are made to be C10, C11, C12, respectively. In addition, in S102 in FIG. 3, an average value of pixels which are contained in a horizontal narrow area is obtained area by area. In the example shown in (C) of FIG. 4, the 3×3 areas are divided into horizontal narrow areas which are defined by thick solid lines, and an average value of pixels which are contained in each of the horizontal narrow area is obtained area by area, and the obtained average values are made to be C20, C21, C22, respectively. Note that the order in which the steps S101 and S102 are performed is arbitrary.

In S103 in FIG. 3, whether or not there exists a horizontal gradation is determined based on the average values obtained for the respective areas in S101. In the example shown in (B) of FIG. 4, whether or not the average values C10, C11, C12 obtained in (A) of FIG. 4 meet the following conditions is determined:

C10>C11>C12, and B<(C10−C11)<D, and B<(C11−C12) <D, or C10<C11<C12, and B<(C11−C10)<D, and B<(C12−C11) <D.

If the conditions are met, it results in Y1, and if not, it results in N1.

In S104 in FIG. 3, whether or not there exists a vertical gradation is determined based on the average values obtained for the respective areas in S102. In the example shown in (D) of FIG. 4, whether or not the average values C20, C21, C22 obtained in (C) of FIG. 4 meet the following conditions is determined:

C20>C21>C22, and B<(C20−C21)<D, and B<(C21−C22) <D, or C20<C21<C22, and B<(C21−C20)<D, and B<(C22−C21) <D.

If the conditions are met, it results in Y2, and if not, it results in N2.

In (B) and (D) of FIG. 4, B and D are threshold values. The threshold value B is such as to prevent an erroneous determination in which gray level irregularities are erroneously determined as a gradation. In addition, the threshold value D is such as to prevent an erroneous determination in which an edge is erroneously determined as a gradation. Note that either of the steps S103 and S104 may be performed first. Additionally, the process in S103 may be performed before S102, provided that S103 is performed after S101, and the process in S104 may be performed before S101, provided that S104 is performed after S102.

In S105 in FIG. 3, whether or not there exists a gradation and a direction of the gradation are finally determined based on a result of the determination in S103 and a result of the determination in S104. In an example shown in (E) of FIG. 4, if, for example, a horizontal gradation is detected (Y1) but a vertical gradation is not detected (N2) based on results of the determination made in (B) and (D) of FIG. 4, a gradation direction is determined as horizontal. On the contrary, if a vertical gradation is detected (Y2) but a horizontal direction is not detected (N1), a gradation direction is determined as vertical. If any other determinations than those are made, it is determined that no gradation exists. Of course, if the gradations in both the directions are detected (Y1 & Y2), it may be determined that an oblique gradation is detected or it may be further determined in which oblique direction the gradation is oriented, or at which angle, for example, 45 degrees or 135 degrees, the gradation is inclined.

In general, a color image is made up of several color components such as RGB, CMY, or L*a*b*. For example, the determinations of gradation direction that are performed in the aforesaid steps S101 to S105 may be performed on the respective color components, and the gradation direction may be finally determined by totalizing results of the determinations made on the respective color components. To simplify the determination process, the gradation direction may be determined based only on luminance (for example an L* value). In addition, if it is determined that there exists no gradation as a result of the gradation direction being determined based on luminance (for example, an L* value), then, the gradation is further determined based on chroma (for example, an a* value and a b* value), so that the gradation direction may finally be determined. Of course, the gradation direction may be determined not by performing the determinations on the respective color components but by processing obtained information as color values, and in S101 and S102 ((A) and (C) of FIG. 4), average color values may be obtained, and in S103 and 104 ((B) and (D) of FIG. 4), the gradation direction may be determined using a difference in color.

In S106 in FIG. 6, the reference area setting unit 12 sets a shape of a reference area that is used when the color estimation unit 13 estimates a color based on the result of the determination made by the gradation direction determination unit 11 in S105. FIGS. 5A to 5D show explanatory diagrams which explain exemplary examples of the operation of the reference area setting unit. Here, an area which is referred to when a color is estimated for a flat color area where no gradation exists is made to be a square area having a size shown in FIG. 5A.

For example, in the event that the gradation direction determined by the gradation direction determination unit 11 is vertical, as is shown in FIG. 5B, a horizontally elongated reference area which is short in a vertical direction is set. In addition, in the event that the gradation direction determined by the gradation direction determination unit 11 is horizontal, as is shown in FIG. 5C, a vertically elongated reference area which is short in a horizontal direction is set. In these reference areas, when compared with the reference area shown in FIG. 5A, a change in color or density within the reference area becomes small.

In addition, in the event that the gradation direction determination shown in (E) of FIG. 4 is performed, since the gradation direction is determined as vertical, horizontal or other than those only, any of the reference areas shown in FIGS. 5A to 5C is set. For example, even in the event that both the vertical and horizontal gradation directions are detected (Y1 & Y2 in (E) of FIG. 4), when the result of the determination is informed to the reference area setting unit 12, for example, as is shown in FIG. 5D, a reference area may be set which is short in both the vertical and horizontal directions. Alternatively, in this case, the color estimation unit 13 may be advised not to perform a color estimation process. Furthermore, in the event that the gradation direction determination unit 11 determines a gradation direction as being oblique or inclined in a 45-degree or 135-degree direction relative to the horizontal direction and a result of the determination is informed, an obliquely narrow reference area may be set which is made short with respect to the gradation direction so informed.

In S107 in FIG. 3, the color estimation unit 13 estimates an original color which resulted before it is affected by the non-target image superimposition by employing the reference area set by the reference area setting unit 12 in S106, so as to substitute the pixel of the input image with the estimated color. Whether or not there remains an unprocessed pixel is determined in S108 in FIG. 3, and if there remains an unprocessed pixel, the flow returns to S101, where the unprocessed pixel is processed appropriately. When all the pixels have been processed, the series of processes shown in FIG. 3 is completed, the processed image is outputted. Note that the processes in S101 to S105 and furthermore, the process in S106 doe not have to be performed for each pixel, and hence, the results of the determinations of gradation and furthermore, the shape and size of the reference area may be made to be commonly used for, for example, the pixels within the square areas shown in (A) and (B) of FIG. 4.

Furthermore, a specific example of a process performed by the color estimation unit 13 in S107 in FIG. 3 will be described. FIG. 6 is a flowchart illustrating an example of the operation of the color estimation unit which is performed for the process in S107, and FIGS. 7A to 7C show explanatory diagrams which illustrate the exemplary example of the operation of the color estimation unit. Here, a process will be described which is to be performed on a pixel of interest (P) in the input image. It is assumed that the reference area setting unit 12 has already set a reference area W(P) which contains the pixel of interest (P).

Firstly, in S111, the color histogram calculation section 21 calculates histograms for pixels which are contained in the reference area that has been set by the reference area setting unit 12. Here, a portion defined by thick solid lines in FIG. 7A is understood to be the reference area W(P) that has been set for the pixel of interest (P) by the reference area setting unit 12, and histograms for colors of pixels within this range (that is, a frequency distribution in a color space) are calculated. The histograms so calculated become frequency values within, for example, a three-dimensional color space as is shown in FIG. 7B.

The reference area is, of course, not limited to a square as is shown in FIG. 7A but becomes a horizontally elongated or vertically elongated rectangular area as is shown in FIG. 5B or FIG. 5C. In the case of the gradation direction being vertical, for example, in the event that a horizontally elongated rectangular area as is shown in FIG. 5B is used as the reference area, a change in color due to gradation becomes less than when the reference area shown in FIG. 5A is used, and the expansion of color in the color space becomes small when color histograms are calculated. In addition, in the case of the gradation direction being horizontal, for example, in the event that a vertically elongated rectangular area as is shown in FIG. 5C is used as the reference area, a change in color due to gradation becomes less than when the reference area shown in FIG. 5A is used, and the expansion of color in the color space becomes small when color histograms are calculated.

Following this, in step S112, the color value candidate selection section 22 defines a partial color space in the vicinity of the position of a pixel value of the pixel of interest P in the color space. In FIG. 7B, an example is shown in which the position of the pixel value V(P) of the pixel of interest P in the color space is indicated by a black circle, and a cube in which the relevant position makes up one of vertices thereof is defined as a partial color space S(P). This partial color space is an area where a color value which substitutes the pixel value of the pixel of interest P (in other words, an estimation color value which is estimated as a color value of the original color which is not affected by the non-target image superimposition) is looked for. The position, size and shape of the partial color space S(P) may be fixed in advance or may be set appropriately based on characteristics of image data or the pixel value of the pixel of interest P. For example, a rectangular parallelepiped or a sphere may be used as the shape of the partial color space. However, normally, a pixel value of a pixel in which a non-target image superimposition is occurring is a subtractive color mixing of the color of a target image and the color of the non-target or undesirable image, and therefore, the position of the partial color space is preferably determined in consideration of this fact. FIG. 7B shows a case where the partial color space S(P) is situated in an area whose brightness is higher than the pixel value V(P) of the pixel of interest P.

In addition, in the event that the partial color space S(P) is the cube, the size (the length of a side) of the cube may be determined based on the pixel value of the pixel of interest as follows, for example. Namely, let the brightness of the pixel value V(P) of the pixel of interest P be B(P) and the degree of edge of the pixel of interest P be E(P), the length L of a side of the cube will be determined according to the following equations:

$$L=f[B(P)]; f[x] \text{ is a monotone increasing function of } x \quad (1)$$

$$L=g[E(P)]; g[x] \text{ is a monotone decreasing function of } x \quad (2)$$

For example, $f(x)=a \times x^{(r)}$, where a is a positive constant, and r is a real value which is equal to or larger than one. In addition, g(x) is, for example, $-a \times x^{(r)}$. Alternatively, g(x) may be an exponential decreasing function such as $g(x)=a \times \exp(-x^r)$. Namely, in Equation (1), the brighter the pixel of interest is, the larger the size of the partial color space s(P) is set. In case the size of the partial color space S(P) is made larger, the number of pixels which are contained in the relevant space becomes larger. Consequently, a pixel whose color value is apart from the pixel value of the pixel of interest (that is, whose distance in the color space is large) is made to be selected as a candidate. This is because the empirical fact is taken into consideration that as the brightness of the pixel becomes increases, the color value of the pixel has to be substituted with a color value of higher brightness, otherwise it becomes difficult to remove completely a non-target image superimposition.

In addition, in Equation (2), as the degree of edge of the pixel of interest P decreases, the size of the partial color space S(P) is preferably set larger. This is because in the event that the degree of edge is high (that is, the relevant pixel lies in the neighborhood of the edge area), a pixel whose color value is far away from the pixel value V(P) of the pixel of interest P is prevented from being selected as a candidate. The change in gray scale or density is large in the edge region, and the possibility is not low that there exist a plurality of colors as the original color that is not affected by the non-target image superimposition. Because of this, in order not to estimate a wrong color as the original color, the size of the partial color space S(P) should preferably be made small. In addition, a color may be estimated from a wide range of colors for a non-edge area, and even in the event that the color is changed due to the non-target image superimposition, the color that would exist before the non-target image superimposition is estimated properly.

In addition, the length L of one side of the cube may be calculated according to the following equation by taking into consideration both brightness and degree of edge by combining Equation (1) and Equation (2).

$$L=q1 \times f[B(P)]+q2 \times g[E(P)] \quad (3)$$

where, q1, q2 denote weight coefficients. The size and shape of a partial color space S(P) like one defined as above may be set at the parameter inputting section 24, in addition to the color value candidate selection section 22.

Following this, in step S113, the color value candidate selection section 22 determines peak positions (that is, pixel values at which frequency takes a local maximum) and values thereof (frequency peak values) from the color histograms calculated in S111. The peak position may be determined, for example, by calculating a differential value and a quadratic differential value of a three-dimensional color histogram. Then, the color value candidate selection section 22 selects the peak positions as color value candidates which are candidates for the original color in which no non-target image superimposition occurs. In addition, pixel values which are present within the partial color space S(P) are extracted from the peak positions. In an example shown in FIG. 7B, a three-dimensional area (a partial color space) is made to be a target for quadratic differential. The three-dimensional area which makes up the target for quadratic differential is taken out to be solely shown in FIG. 7C, and black circles indicate colors whose frequencies become maximum due to quadratic differential. These colors make up color value candidates.

Following this, in step S114, the color value candidate selection section 22 selects only a predetermined number (for example, "three") of pixel values or peak positions from those extracted and makes the pixel values so selected color value candidates. As a selecting method, for example, the peak positions are selected in order of peak sharpness based on the quadratic differential values of the three-dimensional color histograms. Alternatively, the peak positions are selected in order of magnitude of frequency peak value. Alternatively, in the event that the number of peak positions so extracted does not reach the predetermined number, the pixel values of all the extracted peak positions may be selected as the color value candidates. FIG. 7C shows a case where three color value candidates C1(P), C2(P) and C3(P) are selected.

Following this, in step S115, the estimation color determination section 23 estimates an original color for the pixel of interest P in which no non-target image superimposition occurs based on the color value candidates, and determines the estimation color. The estimation of the original color which would exist before the non-target image superimposition has occurred may be performed by adopting at least any one of the following four criteria. Note that in the following criteria, n=1, 2, ..., N, where N denotes a total number of color value candidates selected.

(A) Frequency value of color value candidate Cn(P): (specifically, a color value candidate whose frequency value is larger is determined as being closer to the original color value).

(B) Difference in color value between the pixel value V(P) of the pixel of interest and the color value of the color value candidate Cn(P): (specifically, a smaller color difference relative to the pixel value V(P) of the pixel of interest is determined as being closer to the original color value).

(C) Relationship between the degree of edge E(P) of the pixel of interest and the brightness of the color value candidate Cn(P): (specifically, as the degree of edge E(P) of the pixel of interest becomes smaller, a color value candidate of higher brightness is determined as being close to the original color value).

(D) Relationship between brightness value of the pixel value V(P) of the pixel of interest and brightness value of the color value candidate Cn(P): (specifically, as the brightness of the pixel of interest P becomes higher, a color value candidate of higher brightness is determined as being closer to the original color value).

The color value candidate Cn(P) which is determined as being closest to the original color value using any of the criteria described above is determined as the estimation color and the pixel value V(P) of the pixel of interest is substituted thereby. For example, when adopting Criteria (A), the pixel value V(P) of the pixel of interest is substituted by a color value candidate Cn(P) whose frequency value is largest.

In addition, the estimation color may be determined by a combination of the four criteria described above. Specifically, a degree of true color value Dn(P), which is defined by the following equation, is calculated for each of color value candidates Cn(P), and a color value candidate which has a highest degree of true color value D (=Max {D1(P), D2(P), ..., DN(P)}) in those so calculated is determined as a color value for the original color in which no non-target image superimposition occurs. Note that Max (Xn) (n=1, 2, ...) denotes a maximum value of X1, X2, .... The degree of true color value Dn(P) is obtained, for example, in the following manner.

$$Dn(P) = \qquad (4)$$
$$w1 \times f1[Sn(P)/\text{Max}(Sn(P))] + w2 \times g1[\text{ABS}(V(P) - Cn(P))] +$$
$$w3 \times g2[E(P)] \times f2[Ln(P)] + w4 \times f3[L(P)] \times f4[Ln(P)]$$

where, in the equation above, fi[X] (i=1 to 4) is a monotone increasing function of X, and gj[X] (j=1 to 2) is a monotone decreasing function of X. In addition, Sn(P) denotes the frequency value of the color value candidate Cn(P), and wm (m=1 to 4, wm>0) denotes a weight coefficient which correspond to each of the criteria (A) to (D) above. Furthermore, L(P) and Ln(P) denote the brightness of the pixel of interest P and the brightness of the color value candidate Cn(P), respectively. In addition, ABS (X) denotes an absolute value of X.

As is seen from Equation (4), first to fourth terms each denote contribution from the criteria (A) to (D) above. Note that although values of the weight coefficients for the respective criteria are arbitrary, they are preferably set such that w1>w2>w3>w4. Namely, in this case, when an estimation color is selected from the color value candidates Cn(P), Criterion (A) (that is, the frequency value Sn(P) of the color value candidate Cn(P)) is regarded relatively as most important, while Criterion (D) (that is, the relationship between the brightness value L(P) of the pixel value V(P) of the pixel of interest and the brightness value Ln(P) of the color value candidate Cn(P)) is regarded relatively as lest important.

In addition, an estimation color may be determined not by selecting one from the color value candidates but by obtaining an intermediate color from a plurality of color value candidates. Specifically, a value of the true color value CT(P) which corresponds to the pixel of interest P is calculated according the following equation.

$$CT(P) = \sum_{n=1}^{N} kn \cdot Sn(P) \cdot Cn(P) \qquad (5)$$

where, kn denotes a weight coefficient, and for example, kn=1/Max{Sji(P)} relative to all n's (n=1, 2, ...). As is seen from the above equation, in this example, a true color value is calculated for each of N color value candidates by multiplying its color value by its frequency value to be added thereto. In this example, all the extracted color value candidates can be reflected on the estimation color.

In the case of the above equation, Criterion (A) is adopted, but the invention is not limited thereto, and hence, a value calculated by utilizing at least one of the criteria (B) to (D) may be determined as an estimation color. In short, one color value may only have to be able to be determined which can be estimated as the original color value which would exist before the non-target image superimposition has occurred based on information (color value such as brightness and frequency value of the color value) on the selected color value candidates.

In this way, an estimation color is determined for a certain pixel of interest P, and the estimation color so determined is substituted with the inputted pixel value of the pixel of interest P. As has been described above, the estimation color is determined by referring to the reference area set in the reference area setting unit 12. Because of this, for example, even in the event that a gradation is present in the input image, since the width of the gradation direction is made narrow so as to make small the change in color within the reference area, the original color which would result before the non-target image superimposition has occurred is estimated without being affected by bright colors within the reference area. For example, in JP-A-2001-169080, a predetermined area in a non-edge area is made to be represented by two colors, and a brighter color of the two is made to be an estimation color, so as to substitute pixels within the predetermined area with the estimation color. Because of this, in case a gradation is present, each area is painted thoroughly with the brighter color, and there is eventually caused a difference in color level between the areas. Because of this, with the technique described in JP-A-2001-169080, no gradation can be held. In addition, in case a gradation is present, the gradation is converted into the brighter color in the reference area, whereby the image becomes brighter than the original image, and hence, color information of the original image cannot be maintained. In contrast to this, according to the exemplary embodiment of the invention, no such difference in color level is produced, and if any gradation portion, the gradation is held, and the color information of the original image is maintained.

Note that parameters present outside the reference area which are used in the respective sections of the color estimation unit 13 may be inputted to be set from the parameter inputting section 24 by the user. Alternatively, sets of parameters and predetermined characteristics of images are stored in advance in a storage unit such as a ROM, so that a set of parameters which is most suitable for the characteristics of an input image may be read out from the storage unit for use.

In addition, in the processing example shown in FIG. 6, while the reference area set by the reference area setting unit 12 is described as being used, for example, parameters such as shape and size of a reference area to be set may be made to be received by the color histogram calculation section 21, so that the color histogram calculation section 21 determines a pixel which is actually referred to based on the pixel of interest P, so as to set, for example, such that the pixel of interest P constitutes the center of the reference area. It is assumed for example, that the reference area setting unit 12 sets an area having a size of 100 pixels×100 pixels as the reference area, the relevant reference area W (and color histograms calculated from the reference area W) are used for 5×5 pixels=25 pixels (a group of pixels of interest) which lie in the vicinity of the center of the reference area so set. By adopting this configuration, the number of times of performing the color histogram calculation process, whereby the total processing speed is increased. As this occurs, in the event that the size of the reference area W is sufficiently larger than the size of the group of pixels of interest, an error in calculated color histograms is made small, and the non-target image superimposition eliminating capability does not have to substantially be reduced.

The configuration of the color estimation unit 13 shown in FIG. 4 and the operation of the color estimation unit 13 shown in FIGS. 6 and 7A to 7C are the examples thereof, and hence, other configurations may be adopted in which the original color which is free from the effect of the non-target image superimposition is estimated by other methods.

FIG. 8 is a block diagram showing a second exemplary embodiment of the invention. In the figure, reference numeral 14 denotes an edge area removing unit. Here, a feature which is different from the first exemplary embodiment will mainly be described.

The edge area removing unit 14 removes an area where an edge is present from an input image. An edge area determination method is arbitrary. By adopting this configuration in which the edge area is removed, for example, in the event that a character and/or line is present, an area where such a character and/or line is present is removed.

A gradation direction determination unit 11 determines a gradation direction based on the image from which the edge area is removed by the edge area removing unit 14. For example, as has been described with respect to FIG. 4, an average value of pixels in a vertically or horizontally elongated area is calculated. As this occurs, in case a character and/or line is present in the gradation, the average value is changed by the effect of presence of the character and/or line, whereby the gradation direction cannot be determined properly. However, since the edge area where the character and/or line is present is removed by the edge area removing unit 14, even though a character and/or line is present in the gradation, the gradation direction can be determined properly.

FIGS. 9A to 9D show explanatory diagrams showing specific examples of a relationship between gradation and reference area in the second exemplary embodiment of the invention. In this way, in the event that characters are present in a gradation as is shown in FIGS. 9A and 9B, for example, a gradation direction is determined by removing portions where the characters are present. In addition, in FIGS. 9C and 9D, the portions where the characters were removed are indicated by broken lines. FIGS. 9A and 9C illustrate a case where the characters are present in a vertical gradation in which color or density changes in a vertical direction. The portions where the characters are present are removed by the edge area removing unit 14, and as is shown in FIG. 9C, a gradation direction is determined without being affected by the characters, and a horizontally elongated reference area is set. In addition, FIGS. 9B and 9D illustrate a case where the characters are present in a horizontal gradation in which color or density changes in a horizontal direction. The portions where the characters are present are removed by the edge area removing unit 14, and as is shown in FIG. 9D, a gradation direction is determined without being affected by the characters, and a vertically elongated reference area is set. The estimation of a color which resulted before the non-target image superimposition has occurred is performed properly by a color estimation unit 13 using these reference areas.

FIG. 10 is a block diagram showing a third exemplary embodiment of the invention. In the figure, reference numeral 15 denotes a reduction unit, and 16 an edge determination unit. The reduction unit 15 performs a reduction process on an input image. Any known reduction methods may be used as a reduction method. Although a reduction ratio is arbitrary, as to a halftone image area which is screen processed, reduction should be performed in such a way that halftone dots are collapsed.

A gradation direction determination unit 11 determines a gradation direction based on the image which is reduced by the reduction unit 15. In case a gradation direction is determined as is shown in FIG. 4, for example, by utilizing the halftone image as it is, in some cases, an erroneous determination may be caused due to a large difference in color or density between a halftone dot portion and a background portion. In this exemplary embodiment, since the halftone dots are collapsed by the reduction unit 15, the gradation direction is determined properly.

In addition, in this exemplary embodiment, a configuration is adopted in which the edge determination unit 16 is provided, and a result of a determination made by the relevant unit is made to be used by a color estimation unit 13. The edge determination unit 16 determines an edge in the image based on the image which is reduced by the reduction unit 15. An edge determination method is arbitrary. Since the halftone dots are collapsed by reducing the image by the reduction unit 15, an edge is detected properly even in the halftone image.

Following the a result of an edge determination by the edge determination unit 16, the color estimation unit 13 performs a color estimation using the input image as to the edge area where the presence of an edge is indicated by the result of the edge determination. In addition, as to a non-edge area where the presence of something other than an edge is indicated by the result of the edge determination by the edge determination unit 16, the color estimation unit 13 estimates a color of a pixel making up a target for process using the image reduced by the reduction unit 15. Furthermore, various different processing parameters (setting) are made to be used separately between the edge area and the non-edge area when estimating a color.

Since the image reduced by the reduction unit 15 is used in the non-edge area in this way, in the event that the reference area having the size set by the reference area setting unit 12 is applied, a wider range is referred to on the input image than in the event that the input image is used in the edge area. Consequently, a color is allowed to be estimated from colors of pixels in a wide range in the non-edge area, and on the contrary, a color is estimated from colors of pixels in a narrow range in the edge area. An estimation color is obtained from the narrow reference area in the edge area, whereby the edge is preserved.

In addition, different reference areas may be used between the edge area and the non-edge area, and by taking the setting by the reference area setting unit 12 into consideration, the color histogram calculation section 21 may be set respective reference areas. In addition, the reference area setting unit 12 may be configured to set reference areas according to the edge area and the non-edge area in that way by obtaining results of determinations by the edge determination unit 16. For example, it is considered that a united reference width is used commonly for the edge area and the non-edge area on the input image.

The second exemplary embodiment and the third exemplary embodiment, which have been described heretofore, may be combined for use. As this occurs, the edge area removing unit 14 in FIG. 8 and the edge determination unit 16 in FIG. 10 are united together, so that, for example, the edge determination unit 16 in FIG. 10 may be configured to remove an edge area from the reduced image, so as to pass the reduced image from the edge area has been so removed over to the gradation direction determination unit 11. As this occurs, even in the event that a halftone area and a character or a line are present in the gradation portion, the gradation direction is properly determined by the gradation direction determination unit 11, whereby a color resulting before the non-target image superimposition occurred is allowed to be estimated with good accuracy by the color estimation unit 13.

FIG. 11 is an explanatory diagram showing examples of a computer program which results when realizing the functions described in the respective exemplary embodiments by a computer program and a storage medium which stores the computer program and a computer installing therein the storage medium. In the figure, reference numeral 31 denotes a program, 32 a computer, 41 a magneto-optic disk, 42 an optical disk, 43 a magnetic disk, 44 a memory, 51 a CPU, 52 an internal memory, 53 a reading unit, 54 a hard disk, 55, 56 interfaces, and 57 a communication unit.

Part or the whole of the functions of the respective units and sections that have been described by reference to the exemplary embodiments of the invention may be realized by a program 61 which can be executed on a computer. In this case, the program 31 and data that is used by the program 31 may only have to be stored in a storage medium which the computer can read. The storage medium is such as to induce a change in energy in the form of magnetism, light, electricity and the like relative to a reading unit 53 provided in a hardware resource of the computer according to the description contents of the program so as to transmit the description contents of the program in a signal format corresponding to the change so induced to the reading unit 53. For example, the storage medium includes, for example, a magneto-optic disk 71, an optical disk 72 (including a CD, a DVD and the like), a magnetic disk 73, a memory 4 (including an IC card, a memory card and the like) and the like. These storage media are not limited to portable types.

The program 31 is stored in these storage media, the program 31 is read out from the computer by attaching these storage media to the reading unit 53 or the interface 55 of the computer 32 so as to be stored on the internal memory 52 or the hard disk 54, and the program 31 is then executed by the CPU 51, whereby the functions that have been described in the respective exemplary embodiments of the invention may be realized. Alternatively, a configuration may be adopted in which the program 31 is transmitted to the computer 32 via a network or the like, and at the computer 32, the program 31 is received at the communication unit 57 so as to be stored on the internal memory 52 or the hard disk 54, so that the program 31 so stored is then executed by the CPU 51, whereby the functions that have been described in the respective exemplary embodiments may be realized. In addition, various other devices may be connected to the computer 32 via the interface 56, and for example, a display unit for displaying information, an input unit on which the user inputs information and the like are also connected to the computer 32. Of course, an image forming unit may be configured to be connected to the computer 32, so that an image which results after the non-target image superimposition is eliminated may be formed by the image forming unit.

Of course, part of the functions may be configured by hardware, or all of the functions may be configured by the hardware. Alternatively, the invention may be incorporated into a program which contains not only the invention but also other configurations. For example, the invention may be configured as one program together with a control program in an apparatus which incorporates, for example, an image reading apparatus and an image forming apparatus such as a photocopier so as to remove from an image which contains a non-target image superimposition the non-target image superimposition. Of course, when applied to other applications, the invention may be incorporated into a program for the application.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus, comprising:
   a gradation direction determination hardware that determines a gradation direction existing in an image in which a color or density changes by dividing the image into a plurality of boxes of pixels in rows and a plurality of boxes of pixels in columns;
   a reference area setting hardware that sets a shape of a reference area based on a determination result by the gradation direction determination hardware, the reference area oriented to be elongated in a direction perpendicular to the gradation direction or oriented to be short in both vertical and horizontal directions; and
   a color estimation hardware that estimates a color in which a non-target image superimposition does not occur based on a pixel value within the reference area set by the reference area setting hardware and substitute an input pixel value with the estimated color.

2. The image processing apparatus according to claim 1, wherein the gradation direction determination hardware determines the gradation direction based on a change in the color or density which is larger than a first threshold value as a gradation.

3. The image processing apparatus according to claim 1, wherein the gradation direction determination hardware determines whether the gradation direction is vertical or horizontal, and determines an oblique gradation direction when a vertical gradation and a horizontal gradation are detected.

4. The image processing apparatus according to claim 1, wherein the gradation direction determination hardware determines the gradation direction based on a luminance in the image.

5. The image processing apparatus according to claim 4, wherein the gradation direction determination hardware determines the gradation direction based on a chroma, when the determination result based on the luminance is not gradation.

6. The image processing apparatus according to claim 1, further comprising:
   an edge area removing hardware that removes an edge area from the image, wherein the gradation direction determination hardware determines the gradation direction based on an image from which the edge area is removed by the edge area removing hardware.

7. The image processing apparatus according to claim 1, further comprising:
a reduction hardware that reduces an image,
wherein the gradation direction determination hardware determines the gradation direction based on the reduced image.

8. The image processing apparatus according to claim 1, wherein the reference area setting hardware sets the shape of the reference area so that a width of the shape in the gradation direction is shorter than a width of the shape in another direction.

9. A non-transitory computer readable medium storing a program causing a computer to execute a process for processing an image, the process comprising:
determining a gradation direction existing in an image in which a color or density changes by dividing the image into a plurality of boxes of pixels in rows and a plurality of boxes of pixels in columns;
setting a shape of a reference area based on a determination result, the reference area oriented to be elongated in a direction perpendicular to the gradation direction or oriented to be short in both vertical and horizontal directions; and
estimating a color in which a non-target image superimposition does not occur based on a pixel value within the reference area and substituting an input pixel value with the estimated color.

10. The non-transitory computer readable medium storing a program causing a computer to execute a process for processing an image according to claim 9,
wherein the determining of the gradation direction comprises determining the gradation direction based on a change in the color or density which is larger than a first threshold value as a gradation.

11. The non-transitory computer readable medium storing a program causing a computer to execute a process for processing an image according to claim 9,
wherein the determining of the gradation direction comprises determining whether the gradation direction is vertical or horizontal, and determining an oblique gradation direction when a vertical gradation and a horizontal gradation are detected.

12. The non-transitory computer readable medium storing a program causing a computer to execute a process for processing an image according to claim 9,
wherein the determining of the gradation direction comprises determining the gradation direction based on a luminance in the image.

13. The non-transitory computer readable medium storing a program causing a computer to execute a process for processing an image according to claim 12,
wherein the determining of the gradation direction comprises determining the gradation direction based on a chroma, when the determination result based on the luminance is not gradation.

14. The non-transitory computer readable medium storing a program causing a computer to execute a process for processing an image according to claim 9, further comprising:
removing an edge area from the image,
wherein the determining of the gradation direction comprises determining the gradation direction based on an image from which the edge area is removed.

15. The non-transitory computer readable medium storing a program causing a computer to execute a process for processing an image according to claim 9, further comprising:
reducing the image,
wherein the determining of the gradation direction comprises determining the gradation direction based on the reduced image.

16. The non-transitory computer readable medium storing a program causing a computer to execute a process for processing an image according to claim 9,
wherein the setting of a shape of a reference area comprises setting the shape of the reference area so that a width of the shape in the gradation direction is shorter than a width of the shape in another direction.

* * * * *